(12) United States Patent
Zhi et al.

(10) Patent No.: US 11,075,380 B2
(45) Date of Patent: Jul. 27, 2021

(54) ENERGY STORAGE DEVICE INCLUDING A COBALT-BASED COMPOUND ELECTRODE

(71) Applicant: City University of Hong Kong, Kowloon (HK)

(72) Inventors: Chunyi Zhi, New Territories (HK); Longtao Ma, Kowloon Tong (HK)

(73) Assignee: City University of Hong Kong, Kowloon (HK)

( * ) Notice: Subject to any disclaimer, the term of this patent is extended or adjusted under 35 U.S.C. 154(b) by 123 days.

(21) Appl. No.: 16/035,967

(22) Filed: Jul. 16, 2018

(65) Prior Publication Data

US 2020/0020945 A1    Jan. 16, 2020

(51) Int. Cl.
| | | |
|---|---|---|
| *H01M 4/525* | (2010.01) | |
| *H01M 4/24* | (2006.01) | |
| *H01M 4/75* | (2006.01) | |
| *H01M 4/583* | (2010.01) | |
| *H01M 4/74* | (2006.01) | |
| H01M 4/02 | (2006.01) | |

(52) U.S. Cl.
CPC ........... *H01M 4/525* (2013.01); *H01M 4/244* (2013.01); *H01M 4/5835* (2013.01); *H01M 4/747* (2013.01); *H01M 4/75* (2013.01); *H01M 2004/027* (2013.01); *H01M 2004/028* (2013.01); *H01M 2220/30* (2013.01)

(58) Field of Classification Search
CPC ........ H01M 4/525; H01M 4/244; H01M 4/75; H01M 4/5835; H01M 4/747; H01M 2220/30; H01M 2004/028; H01M 2004/027; H01M 2300/0085; H01M 10/0565; H01M 10/0567; H01M 4/38; H01M 4/663; H01M 4/1395; H01M 4/483; H01M 4/13; H01M 4/134; H01M 4/139
USPC ........................................................ 429/223
See application file for complete search history.

(56) References Cited

U.S. PATENT DOCUMENTS

2013/0115453 A1*    5/2013    Fan ................ H01G 11/46
                                            428/372

FOREIGN PATENT DOCUMENTS

| CN | 107221716 | 9/2017 |
|---|---|---|
| CN | 107528066 | 12/2017 |

OTHER PUBLICATIONS

Pan, H. et al. Reversible aqueous zinc/manganese oxide energy storage from conversion reactions. Nature Energy, I, 16039 (2016).
Zhang, N. et al. Rechargeable aqueous zinc-manganese dioxide batteries with high energy and power densities. Nat Commun. , 8, 405 (2017).
He, P. et al. High-Performance Aqueous Zinc-Ion Battery Based on Layered H2V30 8 Nanowire Cathode. Small, 13, 1702551 (2017).
Yan, M. et al. Water-Lubricated Intercalation in V2 05 .nH2 0 for High-Capacity and High-Rate Aqueous Rechargeable Zinc Batteries. Adv Mater., 12, 1703 725 (2017).

* cited by examiner

*Primary Examiner* — Gary D Harris
(74) *Attorney, Agent, or Firm* — Renner Kenner Greive Bobak Taylor & Weber

(57) ABSTRACT

A system and method for an energy storage device including a first electrode and a second electrode; the second electrode including a cobalt based compound; and an electrolyte disposed between the first electrode and the second electrode.

21 Claims, 11 Drawing Sheets

ENERGY STORAGE DEVICE INCLUDING A COBALT-BASED COMPOUND ELECTRODE

TECHNICAL FIELD

The present disclosure relates to an energy storage device, an electrode associated with an energy storage device and a method of forming an energy storage device. In particular but not limited, the present invention relates to an energy storage device having improved cycling stability, an electrode associated with the energy storage device and a method of forming the energy storage device.

BACKGROUND

Energy storage devices have been commonplace in a number of industries and products with increasing use of electronics within technologies and products. Energy storage devices provide a power source to various electronics. A stable power source is a requirement for use in devices and technologies that incorporate electronics. Some example energy storage devices that are commonly used are batteries (i.e. cells) or capacitors or supercapacitors.

Energy storage devices with low cost and high safety warrant are becoming a need because of the continuous demand for power to be provided to electronic devices such as for example portable electronic devices, wearable electronic devices as well as other devices such as electric vehicles. Lithium ion batteries are one commonly used power source. Zinc-based batteries are another commonly used electrochemical energy storage device. Zinc-based batteries generally comprise a zinc electrode e.g. a zinc anode that can generally provide a high capacity and a low redox potential vs. stand hydrogen electrode (SHE). The zinc electrode also demonstrates a potentially large voltage window e.g. greater than 2V.

However, zinc-based batteries suffer from two common problems. The first being the commonplace use of alkaline electrolytes within zinc-based batteries and the second being cyclic instability. Zinc-based batteries commonly use alkaline electrolytes within them. Alkaline electrolytes are not environmentally friendly and generally result in poor rechargeability (i.e. ability to recharge). Alkaline electrolytes exhibit poor rechargeability because of the formation of irreversible discharged species, such as for example ZnO or Zn(OH)$_2$. In these alkaline systems, the zinc based batteries are either non-rechargeable or poorly rechargeable (usually less than 500 cycles). There is a need for a high voltage, environmentally friendly energy storage device, having long cycling stability.

SUMMARY OF THE INVENTION

It is an object of the present invention to provide an energy storage device having improved cycling stability, or at least provide the public with a useful alternative.

The energy storage device may also provide a substantially high voltage and be environmentally friendly.

Other objects of the invention (or inventions) may become apparent from the following description and drawings, which is given by way of example only.

The present disclosure generally relates to an energy storage device such as for example a battery or supercapacitor. In one form the present disclosure generally relates to an energy storage device having an improved cycling stability and an improved operating voltage. The present disclosure also relates to an electrode associated with the energy storage device.

In one exemplary embodiment the present invention where the energy storage device is a battery. The battery comprises at least an improved cycling stability and/or provides an improved (e.g. higher) operating voltage.

In accordance with a first aspect the present invention relates to an energy storage device comprising:
a first electrode and a second electrode;
the second electrode comprising a cobalt based compound;
an electrolyte disposed between the first electrode and the second electrode.

In an embodiment the cobalt based compound of the second electrode is a cobalt oxide.

In an embodiment the cobalt oxide comprises Cobalt (III) oxide defined as $Co_3O_4$.

In an embodiment the second electrode is a cathode and the first electrode is an anode.

In an embodiment the anode comprises metallic Zinc disposed on a substrate.

In an embodiment, the anode comprises metallic Zinc disposed on a substrate.

In an embodiment, the second electrode comprises a freestanding Cobalt cathode and the first electrode comprises a freestanding Zinc anode.

In an embodiment, the cathode comprises a plurality of Cobalt oxide or Cobalt (II) oxide nanorods.

In an embodiment the second electrode comprises a freestanding Cobalt cathode and the first electrode comprises a freestanding Zinc anode.

In an embodiment the cathode comprises a plurality of Cobalt oxide or Cobalt (II) oxide nanorods.

In an embodiment the cathode comprises a plurality of Cobalt (III) oxide nanorods.

In an embodiment the cathode comprises a carbon cloth and Cobalt (III) oxide being disposed on the carbon cloth.

In an embodiment the cathode comprises a carbon cloth, a plurality of Cobalt (III) oxide nanorods disposed on and/or interspersed through a portion of the carbon cloth such that the nanorods are immobilized on or within the carbon cloth.

In an embodiment the cathode is synthesized by growing a plurality of Cobalt (III) oxide nanorods on the carbon cloth using urea, ammonium fluoride an excess Cobalt salt, the nanorods being grown by a hydrothermal process.

In an embodiment the Cobalt (III) oxide nanorods are synthesized via calcination.

In an embodiment the length of the Cobalt (III) oxide nanorods comprise a diameter between 100 nm to 300 nm.

In an embodiment a plurality of Cobalt (III) oxide nanorods are arranged in a bundle and wherein the bundle of rods comprises a diameter of between 0.5 micrometres to 2 micrometres.

In an embodiment each nanorod comprises one or more nanocrystals.

In an embodiment the electrolyte comprises a Zinc compound and a Cobalt compound.

In an embodiment the electrolyte comprises Zinc Sulfate and Cobalt Sulfate.

In an embodiment the electrolyte comprises a polyacrylamide hydrogel with the Zinc Sulfate and Cobalt Sulfate added into the hydrogel.

In an embodiment the energy storage device is a rechargeable battery.

In an embodiment the energy storage device is flexible in bending such that the energy storage can elastically deform while maintaining electrochemical performance of the energy storage device.

In an embodiment the energy storage device is flexible in bending such that the energy storage device can be bent to an angle of 90 degrees for 1000 times without mechanical or structural damage.

In an embodiment the energy storage device comprises an operating voltage of at least 1.5V, a capacity of at least 200 mAh·g$^{-1}$ and a capacity retention of at least 90% over 5000 cycles.

In accordance with a second aspect the present invention relates to an electrode for an energy storage device, the electrode comprising a substrate;

a cobalt compound deposited onto the substrate or interspersed through the substrate.

In an embodiment the cobalt compound is a cobalt oxide.

In an embodiment the cobalt compound is a Cobalt (III) oxide ($Co_3O_4$).

In an embodiment the electrode comprises Cobalt (III) oxide nanorods disposed on the substrate and/or interspersed through the substrate.

In an embodiment the substrate and the cobalt compound defining a monolithic structure.

In an embodiment the substrate comprises a carbon cloth.

In an embodiment the Cobalt (III) oxide nanorods are immobilized on or within the carbon cloth.

In an embodiment the electrode is synthesized by growing a plurality of Cobalt (III) oxide nanorods on the carbon cloth using urea, ammonium fluoride an excess Cobalt salt, the nanorods being grown by a hydrothermal process.

In an embodiment the length of the Cobalt (III) oxide nanorods comprise a diameter between 100 nm to 300 nm.

In an embodiment a plurality of Cobalt (III) oxide nanorods are arranged in a bundle and wherein the bundle of rods comprises a diameter of between 0.5 micrometres to 2 micrometres.

In accordance with a further aspect the present invention comprises a method of synthesizing an energy storage device, the method comprising the steps of:

forming an anode by depositing a metal or metal compound onto a substrate, forming a cathode by depositing a cobalt compound onto a substrate, providing an electrolyte, sandwiching the electrolyte between the anode and the cathode.

In an embodiment, the length of the Cobalt (III) oxide nanorods comprise a diameter between 100 nm to 300 nm.

In an embodiment, a plurality of Cobalt (III) oxide nanorods are arranged in a bundle and wherein the bundle of rods comprises a diameter of between 0.5 micrometres to 2 micrometres.

In an embodiment, the cathode comprises a plurality of Cobalt (III) oxide nanorods disposed on and/or interspersed within the substrate, and wherein the substrate is a carbon cloth.

In an embodiment the cathode comprises a plurality of Cobalt (III) oxide nanorods disposed on and/or interspersed within the substrate, and wherein the substrate is a carbon cloth.

In an embodiment the step of forming the cathode comprises the additional steps of:

providing the a carbon cloth;

providing urea, ammonium fluoride and Cobalt salt to the carbon cloth;

synthesizing Cobalt (III) oxide nanorods by applying a hydrothermal process to the urea, ammonium fluoride and Cobalt salt;

applying a calcination process for at least 2 hours at a temperature of at least 300° C.

In an embodiment the anode is formed by depositing Zinc on a carbon cloth.

In an embodiment the electrolyte is synthesized by:

providing an acrylamide hydrogel;

adding a cobalt compound into the hydrogel; and adding a metal compound into the hydrogel, wherein the cobalt compound and the metal compound are added as additives.

In an embodiment the electrolyte is freeze dried to form a solid state electrolyte prior to sandwiching the electrolyte between the anode and the cathode.

In an embodiment the cobalt compound is Cobalt sulfate and the metal compound is Zinc sulfate and wherein the amount of Zinc sulfate is ten times greater than the amount of Cobalt sulfate.

In accordance with a further aspect the present invention relates to a method of synthesizing an electrode for an energy storage device, the method comprising the steps of:

providing the a carbon cloth as a substrate;

providing the a carbon cloth;

providing urea, ammonium fluoride and Cobalt salt to the carbon cloth;

synthesizing Cobalt (III) oxide nanorods by applying a hydrothermal process to the urea, ammonium fluoride and Cobalt salt;

applying a calcination process for at least 2 hours at a temperature of at least 300° C.; and wherein the electrode provides a Cobalt (III) rich electrode for use in an energy storage device.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

The term battery as described herein defines one or more cells. The battery generates electrical energy from a chemical energy.

The term solid state as used herein means a state of the device in which the materials and/or components are not in a flowable fluid form and retain boundaries without support. Solid state means a device, object, apparatus or component that is in a substantially solid state. The term solid state encompasses a gel state but excludes a pure liquid that has a low viscosity.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

As used herein the term 'and/or' means 'and' or 'or', or where the context allows both.

The invention consists in the foregoing and also envisages constructions of which the following gives examples only. In the following description like numbers denote like features.

As used herein "(s)" following a noun means the plural and/or singular forms of the noun.

In the following description, specific details are given to provide a thorough understanding of the embodiments. However, it will be understood by one of ordinary skill in the art that the embodiments may be practiced without these specific details. For example circuits, etc., may be shown in block diagrams in order not to obscure the embodiments in unnecessary detail. In other instances, well-known modules, structures and techniques may not be shown in detail in order not to obscure the embodiments.

Also, it is noted that at least some embodiments may be described as a method (i.e. process) that is depicted as a flowchart, a flow diagram, a structure diagram, or a block diagram. Although a flowchart may describe the operations as a sequential method, many of the operations can be performed in parallel or concurrently. In addition, the order of the operations may be rearranged. A method (i.e. process) is terminated when its operations are completed.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, substance or method may have other elements, substances or steps in various embodiments. The term "comprising" (and its grammatical variations) as used herein are used in the inclusive sense of "having" or "including" and not in the sense of "consisting only of".

BRIEF DESCRIPTION OF THE DRAWINGS

Notwithstanding any other forms which may fall within the scope of the present disclosure, a preferred embodiment will now be described, by way of example only, with reference to the accompanying drawings in which.

DETAILED DESCRIPTION OF THE PREFERRED EMBODIMENTS

Electronic devices e.g. portable electronics or wearable electronics are rapidly developing. Electronic devices require a power supply that is preferably low cost and safe. Energy storage devices such as for example batteries or capacitors or supercapacitors can function as power sources for electronic devices. Aqueous Zinc based batteries are used in applications that require high safety and low cost. However these Zinc-based batteries suffer from two common drawbacks, first being the commonplace use of alkaline electrolytes within zinc-based batteries and the second being cyclic instability. Alkaline electrolytes can be harmful to the environment and generally exhibit poor rechargeability. There is a need for energy storage devices with a high voltage, environmentally friendly energy storage device, having long cycling stability.

The present disclosure relates to an energy storage device that provides a high voltage and long cycle life (i.e. long cycling stability). The energy storage device may also comprise a high capacity, is flexible and malleable in response to loads. The energy storage device as described herein is configured to generate electrical energy. The energy storage device as described herein may also be configured to store electrical energy received from another energy source.

Figure 1:
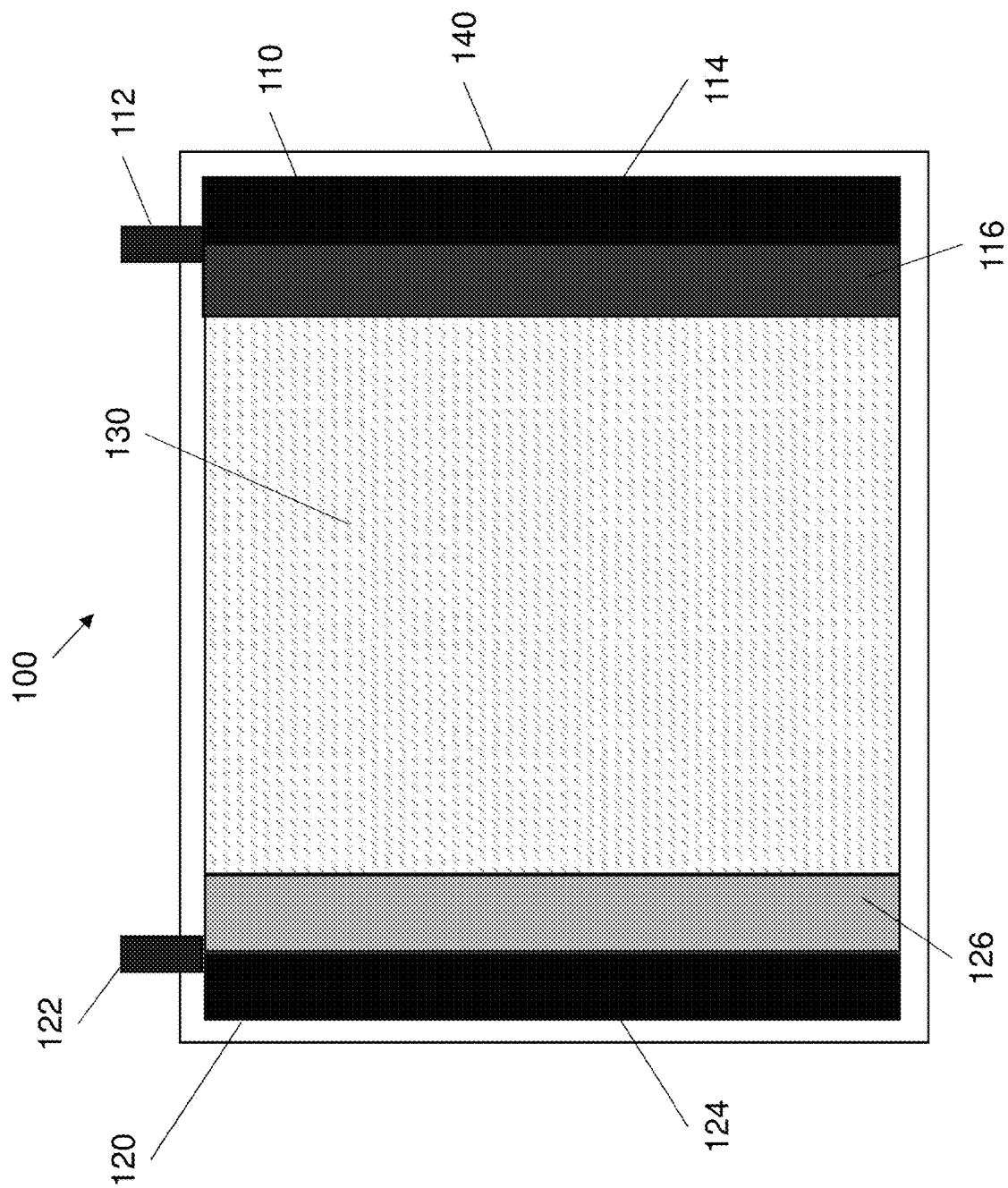
FIG. 1 shows a schematic diagram of an embodiment of an energy storage device.

FIG. 1 shows a first embodiment of an energy storage device 100. The energy storage device 100 illustrated in FIG. 1 is a battery that generates electrical energy from chemical energy. The battery 100 is an electrochemical battery that operates based on a reversible chemical reaction in the battery.

The battery 100 comprises a first electrode 110, a second electrode 120 and an electrolyte 130 disposed between the first electrode 110 and the second electrode 120. The electrolyte 130 electrically couples the first electrode 110 and the second electrode 120. The electrolyte 130 is preferably sandwiched between the first electrode 110 and the second electrode 120. The battery 100 comprises a casing 140 that receives and encases the first electrode 110, second electrode 120 and the electrolyte 130. The casing 140 may be formed in any suitable shape such as for example a cylinder or a rectangular prism or disc shape or any other suitable shape. The casing 140 may be formed from a suitable non electrically conductive material such as for example epoxy or a polymer.

The battery 100 further comprises a first electrical pin 112 and a second electrical pin 122. The first electrical pin 112 is associated with and in electrical communication with the first electrode 110. The second electrical pin 122 is associated with and in electrical communication with the second electrode 120. The first electrical pin 112 and second electrical pin 122 extend partially into and partially out of the casing 140. The first electrical pin 112 and the second electrical pin 122 provide electrical contacts for other electronics or electronic components to electrically couple to the energy storage device 100 (i.e. battery 100) to draw electrical energy i.e. power from the battery 100.

The first electrode 110 functions as an anode and the second electrode 120 functions as a cathode of the battery 100. In operation there is a charge transfer between the anode 110 and the cathode 120 in order to convert chemical energy to electrical energy. The anode 110 and the cathode 120 may be rigid portions or may be flexible. The anode 110 and cathode 120 are arranged in a suitable arrangement dependent on the desired shape of the battery 100.

The first electrode 110 (i.e. anode) comprises a substrate 114 with a metal or metal compound 116 disposed on the substrate 114. The substrate 114 may be any suitable material. In one example the substrate 114 is a carbon cloth. Alternatively the substrate 114 may be a graphite sheet or a spacer fabric or a polymer block. The substrate 114 may have some electrical conductance but is preferably robust enough to function within an electrolyte. The anode 110 preferably comprises zinc metal 116 that is deposited onto the substrate 114. The substrate 114 provides a base layer for the zinc to be deposited onto. The zinc is deposited to form a substantially thick layer of zinc 116. The thickness being dependent on the operational life of the battery 100.

Alternatively the anode 110 may comprise a block or sheet of zinc that is positioned in the casing 140. In this alternative construction the anode 110 may not include a substrate and may include a piece of zinc metal. The zinc metal may be a rigid block or a flexible sheet of zinc metal. The zinc metal is arranged in a suitable configuration based on the desired shape of the battery 100.

The second electrode 120 (i.e. cathode) comprises a substrate 124 with a cobalt compound 126 disposed on the substrate. The substrate 124 may be similar in construction to the anode substrate 114. In one example the substrate 124 i.e. cathode substrate 124 comprises a carbon cloth. Alternatively the substrate may be a graphite sheet or a polymer. The cathode substrate 124 comprises a Cobalt oxide 126 disposed on the substrate 124. Preferably the cathode 120 comprises a Cobalt (III) oxide (i.e. $Co_3O_4$). The cathode 120 is a Cobalt (III) oxide rich cathode that comprises a large quantity of Cobalt (III) oxide deposited on the substrate 124. The Cobalt (III) oxide may be in the form of nanorods or may be formed as a crystalline structure comprising a plurality of Cobalt (III) oxide crystals. In an alternative construction the Cobalt (III) oxide may be formed as a plurality of nano-crystals on the cathode substrate 124.

The electrolyte 130 may be an aqueous solution that is disposed within the housing and the first electrode 110 and second electrode 120 are positioned within the electrolyte.

The electrolyte 130 is preferably an aqueous electrolyte that comprises a Zinc compound and a Cobalt compound. The electrolyte preferably comprises a Zinc sulfate ($ZnSO_4$) and a Cobalt sulfate ($CoSO_4$) within the electrolyte. The Zinc sulfate and Cobalt sulfate are additives within the electrolyte 130. The electrolyte 130 comprises more Zinc sulfate than Cobalt sulfate. The electrolyte 130 comprises at least 5 times more Zinc sulfate additive than Cobalt sulfate additive. In one example form the electrolyte 130 comprises ten times more Zinc sulfate than Cobalt sulfate, e.g. the electrolyte 130 comprises 2M of Zinc sulfate ($ZnSO_4$) and 0.2M of Cobalt sulfate ($CoSO_4$).

The battery 100 as described comprises a high operating voltage, is rechargeable and has high cycling stability.

Figure 2:
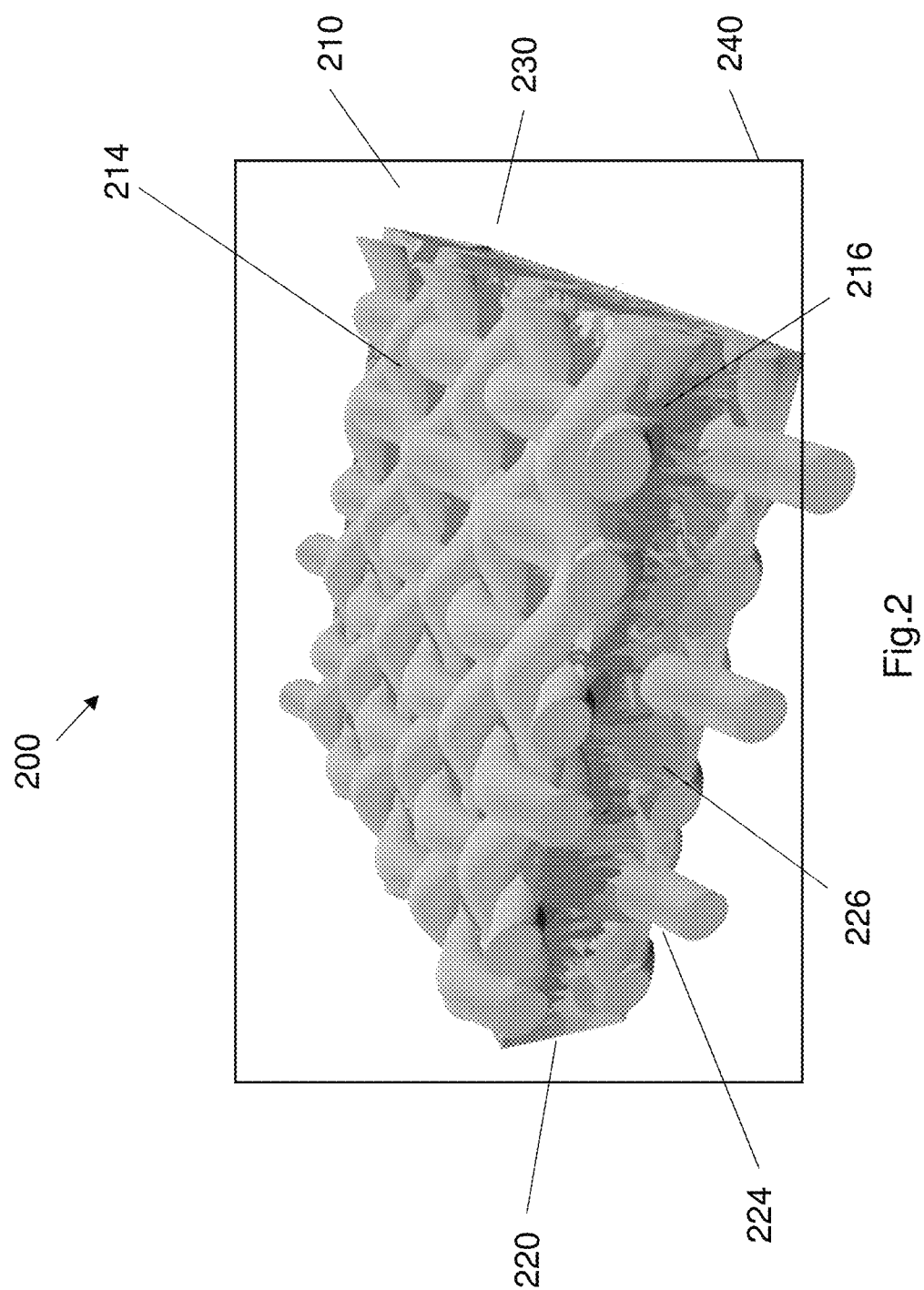
FIG. 2 shows a diagram of an embodiment of another embodiment of an energy storage device.

FIG. 2 shows a further embodiment of an energy storage device 200. The energy storage device 200 is a battery. The battery 200 is a solid state device and is a rechargeable battery. The battery 200 is a solid state device because the electrolyte in the battery 200 is a viscous gel or a solid element.

Referring to FIG. 2, the battery 200 comprises a first electrode 210, a second electrode 220 and an electrolyte 230 sandwiched between the first electrode 210 and the second electrode 220. The first electrode 210 functions as an anode. The second electrode 220 functions as a cathode. The electrolyte 230 electrically couples the anode 210 and the cathode 220 such that charge can be transferred between the anode 210 and the cathode 220. The second electrode 220 preferably comprises a Cobalt based compound.

The anode 210 comprises a substrate 214 and a metal or a metal compound 216 disposed on the anode substrate 214. Preferably the substrate 214 comprises a carbon cloth. The carbon cloth may be flexible thereby allowing the anode 210 to be flexible. The anode comprises metallic Zinc disposed on the anode substrate 214. The first electrode 210 comprises a freestanding Zinc anode.

The cathode 220 comprises a substrate 224 and a Cobalt compound 226 disposed on the substrate 224. The substrate 224 comprises a carbon cloth. The carbon cloth may be a woven carbon cloth or any other suitable structure. The Cobalt compound 226 is grown onto the carbon cloth. The Cobalt compound is preferably a Cobalt oxide. Even more preferably the Cobalt compound is a Cobalt (III) oxide (i.e. $Co_3O_4$). The cathode 220 preferably comprises a plurality of Cobalt (III) oxide nanorods. The cathode is a Cobalt (III) rich electrode.

The plurality of Cobalt (III) oxide nanorods may be disposed on and/or interspersed through a portion of the carbon cloth such that the nanorods are immobilized on or within the carbon cloth. The length of the Cobalt (III) oxide nanorods comprise a diameter between 100 nm to 300 nm. The plurality of Cobalt (III) oxide nanorods are arranged in a bundle and wherein the bundle of nanorods comprises a diameter of between 0.5 micrometres to 2 micrometres. In one example construction the Cobalt (III) oxide nanorods comprise a diameter of 200 nanometres and the bundle of nanorods comprise a diameter of approximately 1 micrometre. In some example constructions each nanorod comprises one or more nanocrystals. Each nanocrystal may comprises an average size of between 10 nanometres to 12 nanometres.

The Cobalt (III) oxide nanorods are synthesized by through a hydrothermal method followed by calcination onto the substrate 224.

In an alternative construction the cathode 220 may comprise Cobalt oxide or Cobalt (II) oxide nanorods disposed on and/or interspersed within a carbon cloth substrate.

The electrolyte 230 is preferably a hydrogel that includes a cobalt compound additive. The electrolyte 230 preferably comprises a Zinc compound and a Cobalt compound. In one example the Zinc compound is a Zinc sulfate ($ZnSO_4$) and the Cobalt compound is a Cobalt sulfate ($CoSO_4$). The hydrogel also comprises a polyacrylamide hydrogel. The hydrogel may be free dried polyacrylamide hydrogel. The polyacrylamide hydrogel includes the Zinc sulfate and Cobalt sulfate additives. The polyacrylamide hydrogel may comprise a mass of interconnected macro-pores which allow ions to transfer freely and adequately in the electrolyte.

The battery 200 may comprise an optional housing 240 that encases the anode 210, cathode 220 and electrolyte 230. The casing is formed from an electrical insulator material such as for example a thermoplastic or an epoxy or an epoxy composite material. The casing 240 is formed into a desired shape as for example a rectangular prism or a disc shape or a cylinder.

The battery 200 may also comprise a first electrical pin (not shown) and a second electrical pin (not shown). The electrical pins of battery 200 may be similar in construction to the pins 112, 122 as described earlier. Each pin is electrically connected to one of the anode 210 or cathode 220. The pins protrude partially out of the casing and provide an interface to couple to external electronic devices or electronic components thereby allowing the battery 200 to be incorporated into an electrical circuit and provide power. The battery 200 is a battery that has an improved cycling stability and has an improved operating voltage.

Figure 3:
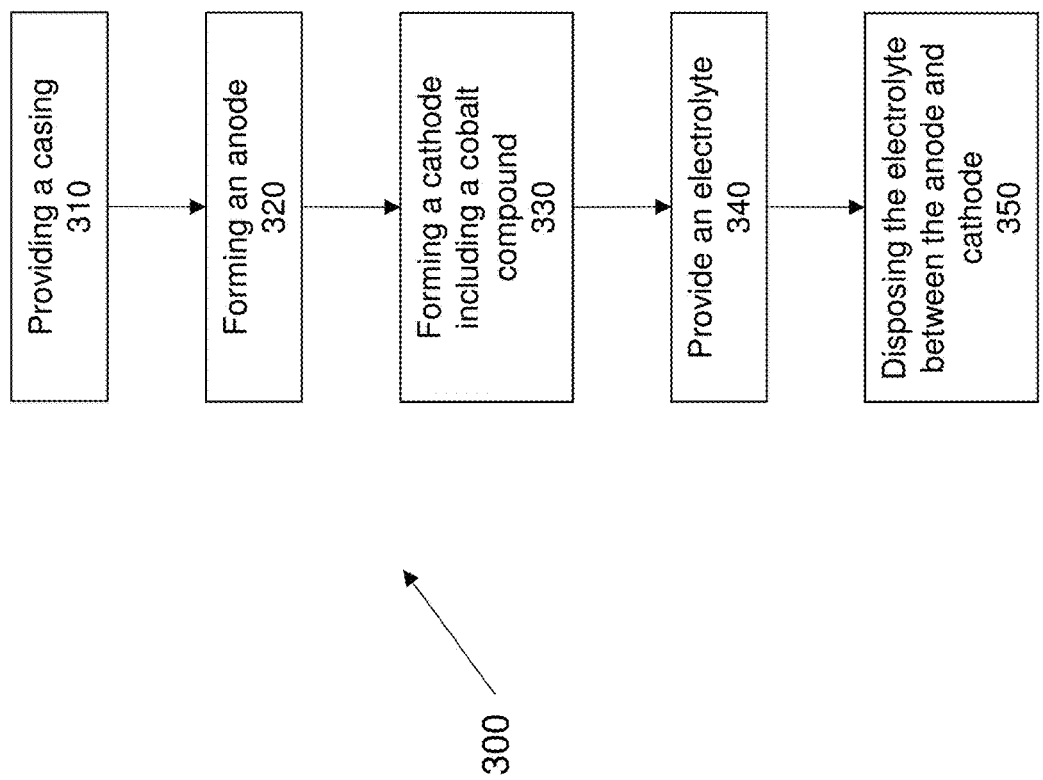
FIG. 3 shows a method of synthesizing an energy storage device.

FIG. 3 shows an example embodiment of a method 300 of synthesizing an energy storage device that comprises an electrode comprising a Cobalt compound. The method 300 is a generalised method of forming a rechargeable battery that comprises a Cobalt compound and has a high operating voltage and cyclic stability.

Referring to FIG. 3, the method 300 commences at step 310. Step 310 comprises providing a casing to house the battery. Step 320 comprises forming an anode by depositing a metal or metal compound on a substrate. Step 330 comprises forming a cathode by depositing a Cobalt compound onto a substrate. The substrate for the anode and cathode may be a carbon cloth. Step 340 comprises providing an electrolyte. Step 350 comprises disposing (i.e. positioning) the electrolyte between the anode and cathode. The anode, cathode and electrolyte are disposed within the casing.

The Cobalt compound is preferably a Cobalt (III) oxide that is disposed on and/or interspersed within the substrate which may be a carbon cloth to form the substrate. The Cobalt (III) oxide may in the form of Cobalt (III) oxide nanorods.

Figure 4:
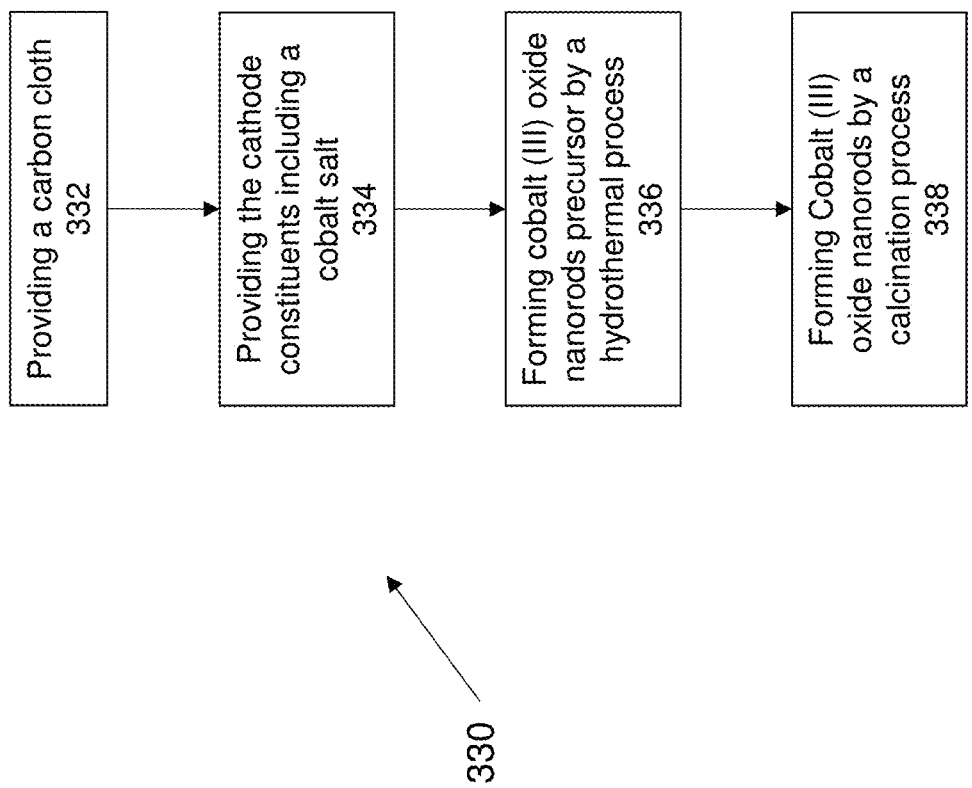
FIG. 4 shows an exemplary method of forming a cathode for an energy storage device according to FIG. 1 or FIG. 2.

FIG. 4 shows an exemplary method of forming a cathode. FIG. 4 shows additional steps to the step 330 from FIG. 300. Step 330 comprises forming a cathode. The method of forming a cathode comprises the additional steps of providing a carbon cloth at step 332. Step 334 comprises providing the constituents of the cathode including urea, ammonium fluoride and Cobalt salt to the carbon cloth. The urea, ammonium fluoride and Cobalt salt may be deposited onto the carbon cloth. Step 336 comprises synthesizing a precursor for Cobalt (III) oxide nanorods by applying a hydrothermal process to the urea, ammonium fluoride and Cobalt salt. Step 338 comprises applying a calcination process for at least 2 hours at a temperature of at least 300° C. to form the Cobalt (III) oxide nanorods. The calcination process may be applied at 350° C. for at least 3 hours. The Coblat (III) oxide is formed by two processes. Step 336 comprises growing uniform nanorod precursors on the carbon cloth by the hydrothermal process. Step 338 results in $Co_3O_4$ nanorods on the carbon cloth. Step 334 comprises providing an excess Cobalt salt in order create a Cobalt (III) rich electrode.

The excess Cobalt salt provides superfluous Cobalt ions in the precursor. The excess cobalt salt increases the ratio of $Co^{3+}$ to $Co^{2+}$ ions in the nanorods to at least 1.5 and more preferably at least 1.6 to 1.7. This indicates an excess of the presence of Cobalt (III) in the Cobalt (III) oxide nanorods. The nanorods may be in the form nanocrystals formed on the substrate i.e. carbon cloth.

Figure 4A:
FIGS. 4a and 4b illustrate scanning electron microscope images of one dimensional nanorods.
Figure 4B:
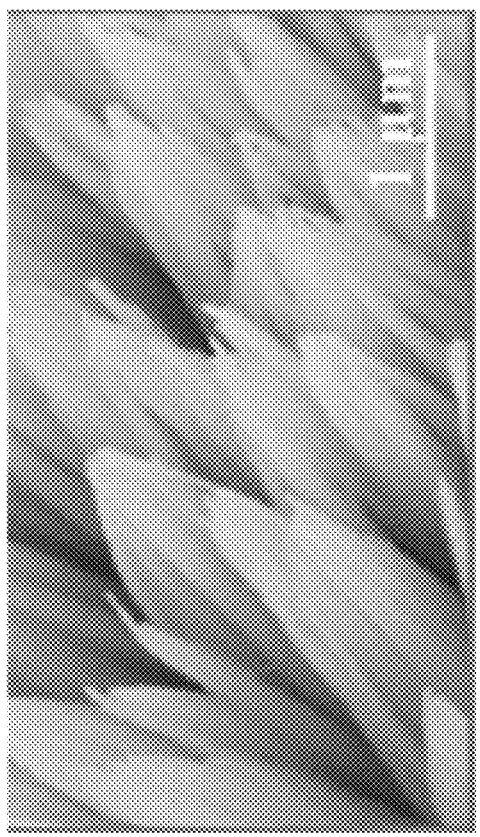

FIGS. 4a and 4b illustrate scanning electron microscope images of one dimensional nanorods. As described earlier the cathode comprises Cobalt (III) oxide nanorods formed on the carbon cloth. FIGS. 4a and 4b show homogeneous one dimensional nanorods that are immobilized on the carbon cloth substrate. The nanorods of Cobalt (III) oxide may be arranged to form a lattice on the substrate e.g. carbon cloth.

Figure 5:
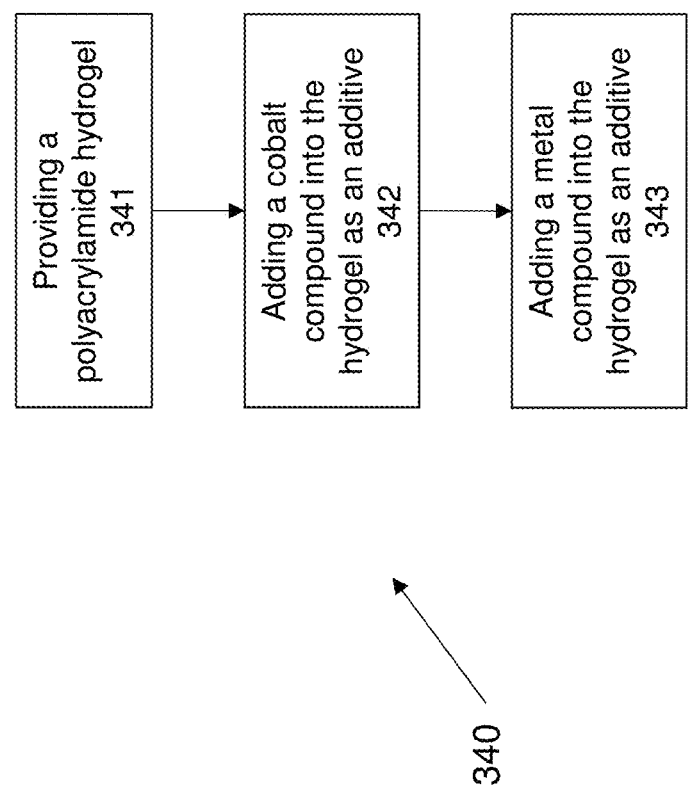
FIG. 5 shows an exemplary method of forming an electrolyte for an energy storage device.

FIG. 5 shows a method of synthesizing an electrolyte. The step 340 comprises the additional steps shown in FIG. 5. The method 340 as shown in FIG. 5 defines an electrolyte 230 for the battery 200, as described earlier.

The method of synthesizing an electrolyte includes the additional step of providing an polyacrylamide hydrogel at step 341. Step 342 comprises adding a cobalt compound into the hydrogel. Step 343 comprises adding a metal compound into the hydrogel, wherein the metal compound and the Cobalt compound are added into the hydrogel as additives. The metal compound and the Cobalt compound are incorporated into the hydrogel. The metal compound is a Zinc sulfate. The Cobalt compound is a Cobalt sulfate. In one example 2M of Zinc sulfate and 0.2M of Cobalt sulfate are added into or incorporated into the acrylamide hydrogel. The hydrogel is formed by crosslinking acrylamide monomers to form the polyacrylamide hydrogel.

In an alternative method of synthesizing an electrolyte may comprise providing acrylamide monomers, Zinc sulfate and Cobalt sulfate. The method may also comprise mixing the Zinc sulfate, Cobalt sulfate and acrylamide monomers and forming a hydrogel by crosslinking the acrylamide monomers.

The electrolyte 130 for battery 100 is formed by mixing Zinc sulfate, Cobalt sulfate into water or deionized water in order to form an aqueous solution. The aqueous solution may be a flowable liquid having a low viscosity such that the electrolyte 130 is flowable.

Figure 6:
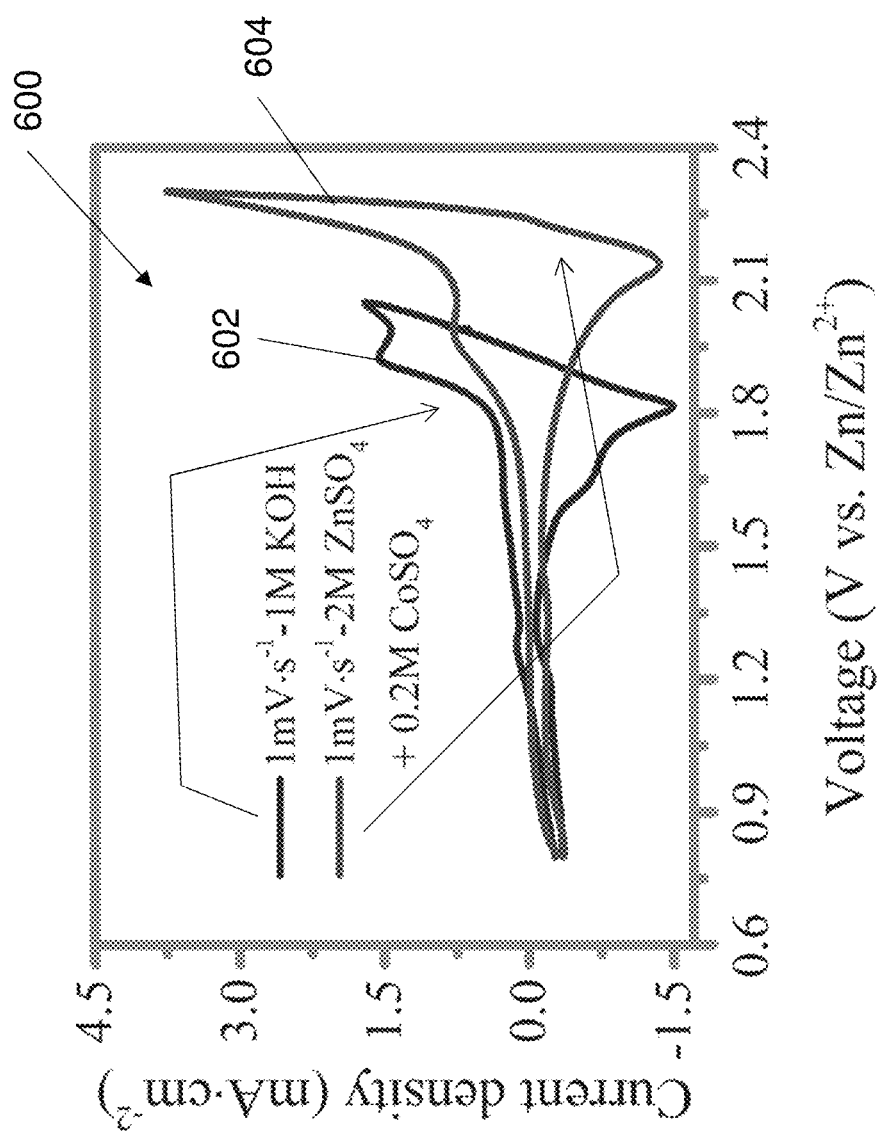
FIG. 6 illustrates a CV curve comparing the electrochemical performance between an alkaline electrolyte and the Zinc sulfate and Cobalt sulfate electrolyte.

The performance of an energy storage device that comprises a Cobalt (III) rich electrode will now be discussed. Commonly used Zinc batteries use alkaline electrolytes. The electrolyte described in battery 100 or 200 that includes Zinc sulfate and Cobalt sulfate provides better electrochemical performance as compared to conventional alkaline electrolytes. The electrochemical performance was tested using cyclic voltammetry (CV) and galvanostatic charge/discharge characterisations. FIG. 6 shows CV curve 600 comparing the electrochemical performance between alkaline electrolytes and the Zinc sulfate and Cobalt sulfate electrolyte (i.e. $ZnSO4$ $CoSO4$). Curve 602 illustrates the performance of an alkaline electrolyte (i.e. KOH electrolyte). Curve 604 illustrates the performance of the Zinc sulfate and Cobalt sulfate electrolyte. As seen from FIG. 6, the Zinc sulfate and Cobalt sulfate electrolyte shows a voltage window of 2.2V, which is much broader than a battery with an alkaline electrolyte that has a voltage window of 1.9V. Curve 600 shows the operating voltage is 2.2V for a battery 100, 200 that includes an electrolyte comprising Cobalt (III) in an electrode and an electrolyte comprising Zinc sulfate and Cobalt sulfate.

Figure 7:
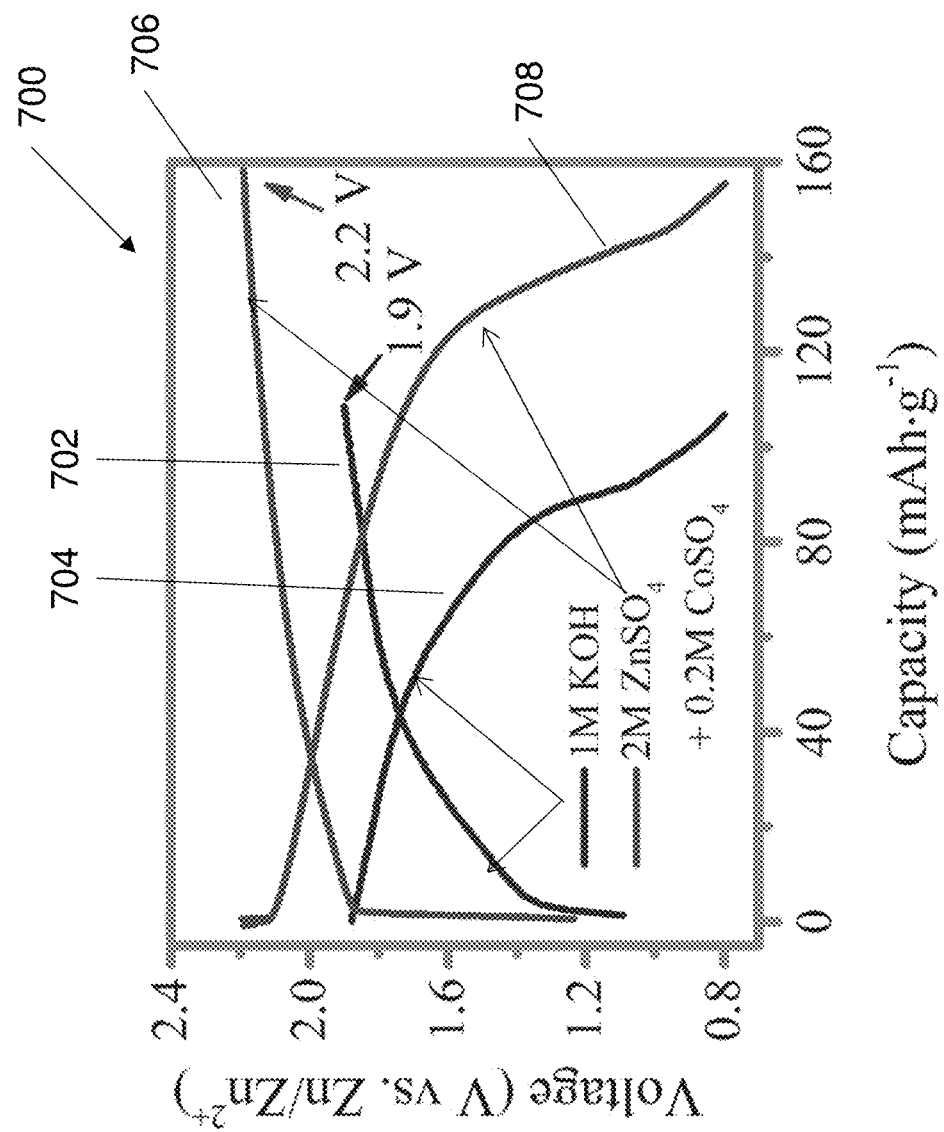
FIG. 7 shows charge discharge polarization curves of an alkaline electrolyte and the Zinc sulfate and Cobalt sulfate electrolyte.

FIG. 7 shows a plot 700 of charge discharge polarization curves. Curves 702, 704 illustrate the charge and discharge polarization curves, respectively for an alkaline electrolyte. As shown in plot 700, the voltage window is 1.9 V for the alkaline batteries. Curves 706, 708 illustrate charge and discharge polarization curves, respectively, for an electrolyte comprising at least Zinc sulfate and Cobalt sulfate. As shown in FIG. 7, the voltage window is 2.2V. Further FIG. 7 shows superior performance of the electrolyte of battery 100, 200 as compared to known alkaline Zn batteries.

Figure 8:
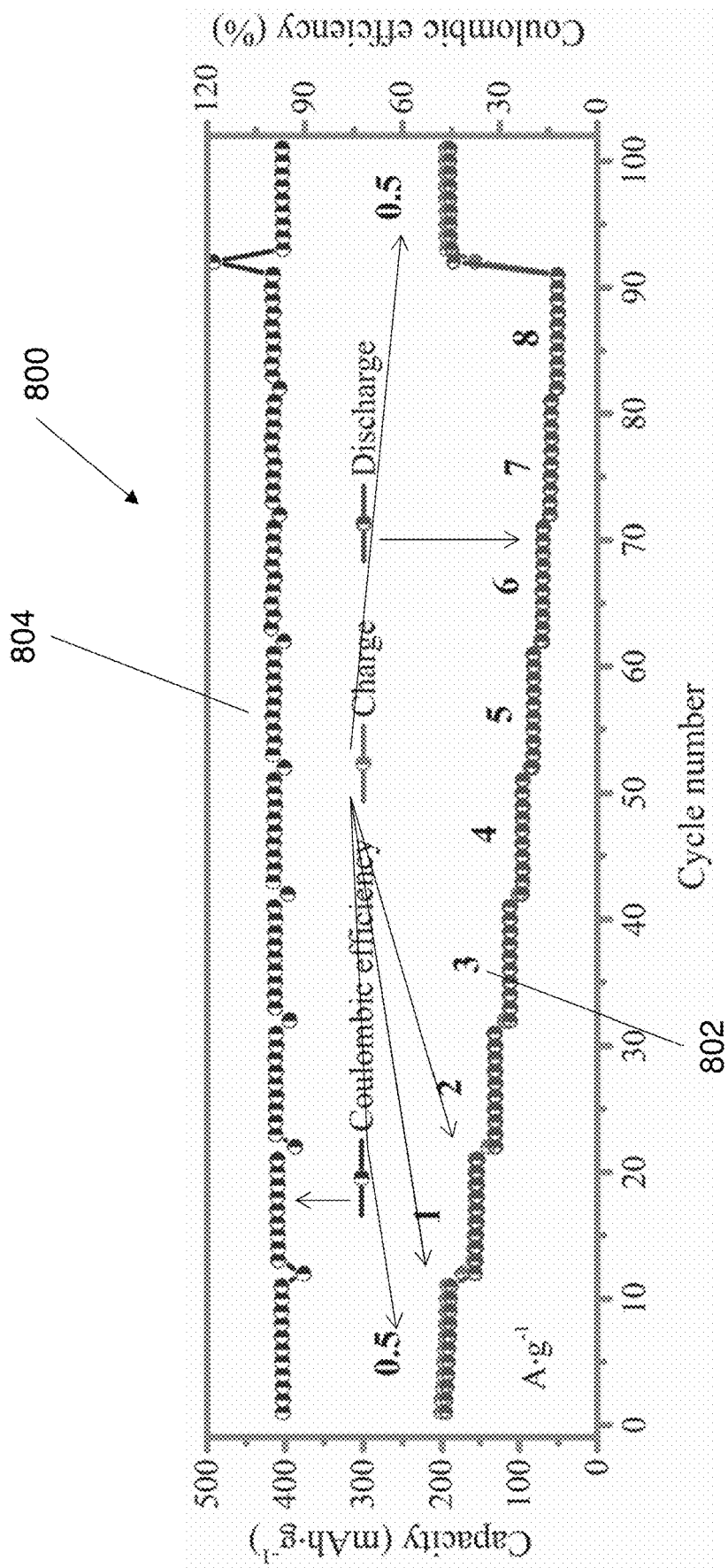
FIG. 8 shows a plot of discharge capacities for the Zinc sulfate and Cobalt sulfate electrolyte and columbic efficiency during the various discharge capacities.

FIG. 8 shows a plot 800 of discharge capacities for the Zinc sulfate and Cobalt sulfate electrolyte. The discharge capacities of 200, 161, 146, 123, 105, 91, 83, 71 and 62 $mAh \cdot g^{-1}$ recorded at rates of 0.5, 1, 2, 3, 4, 5, 6, 7, and 8 $A \cdot g^{-1}$. The discharge capacities are plotted on curve 802. The charging rates are also plotted but follow the discharge capacities. The charging capacities are not labelled for clarity. When the rate shifts back to 0.5 $A \cdot g^{-1}$, the capacity recovered to 200 $mAh \cdot g^{-1}$, showing a strong tolerance to high speed conversion reactions. FIG. 8 also plots columbic efficiency during the various discharge capacities, illustrated as plot 804. As shown in FIG. 8 the columbic efficiency is greater than 80% throughout the tests. The excellent rate performance is attributed to the stabilization and excellent electrochemical kinetics of the Cobalt (III) rich Cobalt (III) oxide nanorod cathode.

Figure 9:
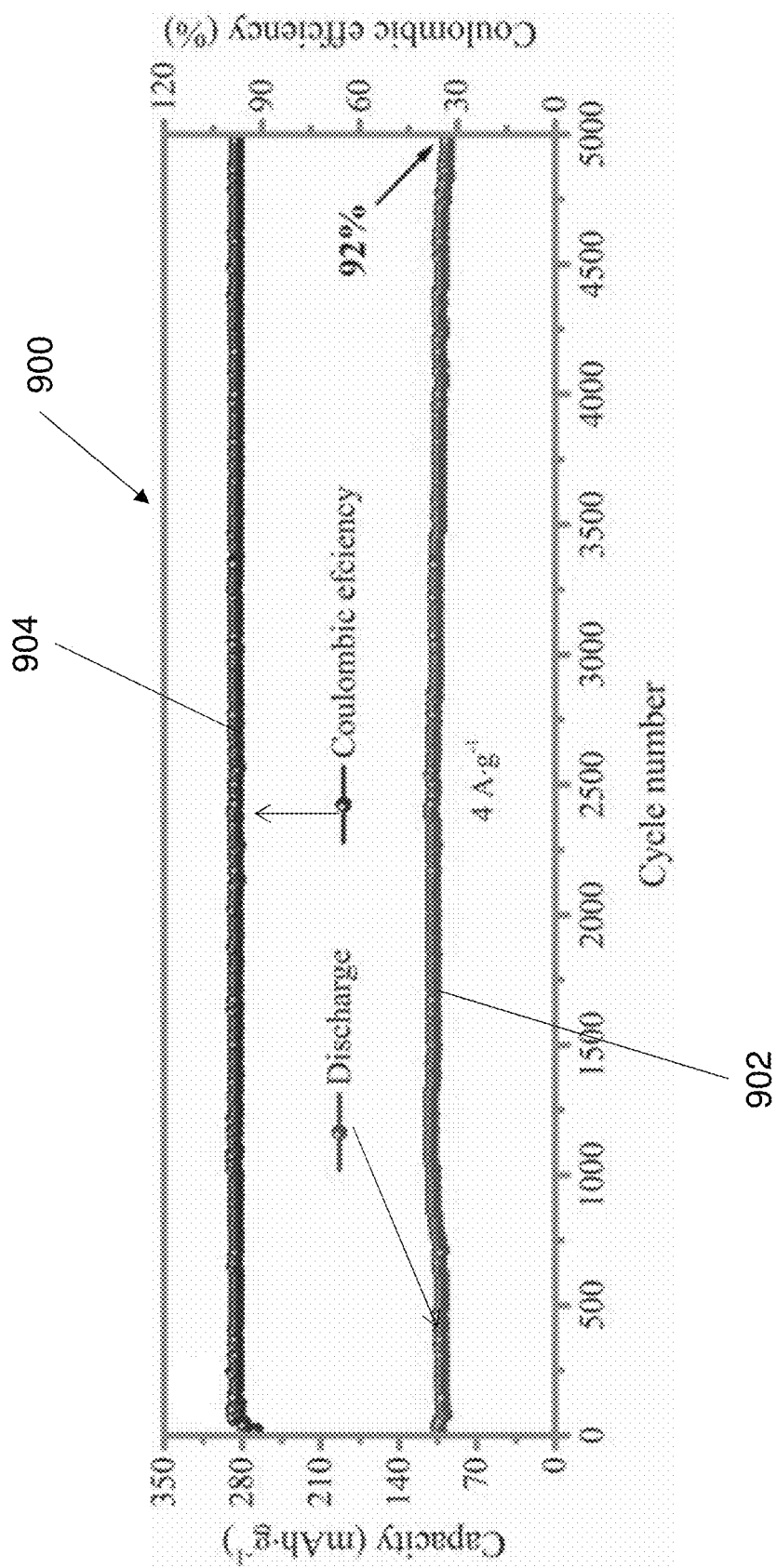
FIG. 9 illustrates the long term cyclic stability of the battery 100, 200 that comprises a Cobalt (III) oxide cathode and an electrolyte that comprises a zinc sulfate and a cobalt sulfate.

FIG. 9 illustrates the long term cyclic stability of the battery 100, 200 that comprises a Cobalt (III) oxide cathode and an electrolyte that comprises a zinc sulfate and a cobalt sulfate. FIG. 9 shows a plot 900 of long term cyclic stability. FIG. 9 shows a curve 902 that shows the battery charge and discharge curve at 4 $A \cdot g^{-1}$. The capacity retention is at least 92% over 5000 cycles. The columbic efficiency is maintained at almost 100% as shown in curve 904. The Cobalt (III) rich battery remains stable even after 5000 cycles indicating excellent structural stability.

The Zinc and Cobalt (III) battery retains its capacity and stability because the structure of the battery and the Zinc sulfate and Cobalt sulfate electrolyte prevent the formation of dendrites on the anode or cathode and also prevents the formation of non-reversible by products such as ZnO or $Zn(OH)_2$. Conversely in standard alkaline zinc batteries (i.e. zinc batteries with an alkaline electrolyte) dendrite formation occurs on at least the anode and non-reversible products are formed in the electrolyte. The use of Cobalt (III) in the electrode (e.g. cathode) and the use of a Cobalt salt in the electrolyte provide a rechargeable battery with long cycling stability (i.e. improved cycling stability). The use of Co (III) oxide to form the cathode also provides for improved structural stability of the cathode.

The Zn/Co (III) rich Cobalt (III) oxide battery with a Zinc sulfate and Cobalt sulfate electrolyte demonstrates a reversible chemical reaction that is high stable even during several thousand cycles e.g. over 2000 cycles. The electrolyte may be an aqueous electrolyte or may be a hydrogel that includes a water component. One main chemical reaction that occurs in a conversion reaction that occurs in-situ. This conversion reaction is between $Co_3O_4$ and $CoO_2$ and this conversion occurs during the charge/discharge cycles. Such a reversible reaction has not been observed in alkaline zinc batteries. This conversion reaction can also help to sustain a high operating voltage e.g. 2.2V and helps to achieve the reversibility i.e. rechargeability of the battery 100, 200.

The electrochemical reaction of the Zn/Co (III) rich Cobalt (III) battery with zinc sulfate and cobalt sulfate aqueous electrolyte is summarized as below. The solid state electrolyte also generally follows the same chemical reaction as shown below.

Cathode: $H_2O \leftrightarrow H^+ + OH^{-1}$ $Co_2O_4 + 2H^+ + e^- \leftrightarrow 3CoO + H_2O$ $Zn^{2+} + 2OH^{-1} + ZnSO_4 + xH_2O \leftrightarrow ZnSO_4 \cdot [Zn(OH)_2]_3 \cdot xH_2O$ Anode: $Zn \leftrightarrow Zn^{2+} + 2e^-$ Overvall: $Co_3O_4 + Zn + (x/3)H_2O + (1/3)ZnSO_4 \cdot [Zn(OH)_2]_3 \cdot (x-1)H_2O$ The reaction in the cathode and the anode is different from known alkaline zinc batteries. Zinc alkaline batteries have a lower operating voltage of 1.9V and poor cycling stability due to irreversible reaction of $Zn + 2OH^- \rightarrow Zn(OH)_2 + 2e^- \rightarrow ZnO + H_2O$.

In contrast in the current battery, the combination of a highly reversible Zn anode and a Cobalt (III) rich Cobalt (III) oxide nanorod cathode exhibits a high operating voltage of at least 2V and more preferably at least 2.2V, a reversible reaction (i.e. rechargeable battery) and a high cycling stability of 5000 cycles with 92% capacity retention. The use of the zinc sulfate and cobalt sulfate electrolyte also provides a battery and electrolyte that is environmentally benign and safe.

The solid state electrolyte e.g. electrolyte 230 and the solid state battery 200 illustrates good ion conductivity due to the highly porous network to allow fast kinetic in the process of charge and discharge. The solid state Zn/Co (III) rich Cobalt (III) oxide battery exhibits long term stability that is better than the aqueous electrolyte battery i.e. battery 100. The solid state battery 200 retains 94.6% capacity even after 2000 cycles at a large current density e.g. 2 $A \cdot g^{-1}$.

The battery 100, 200 is substantially flexible and malleable especially in response to bending. The battery 100, 200 can be bent without compromising the structure and function of the battery.

Figure 10:
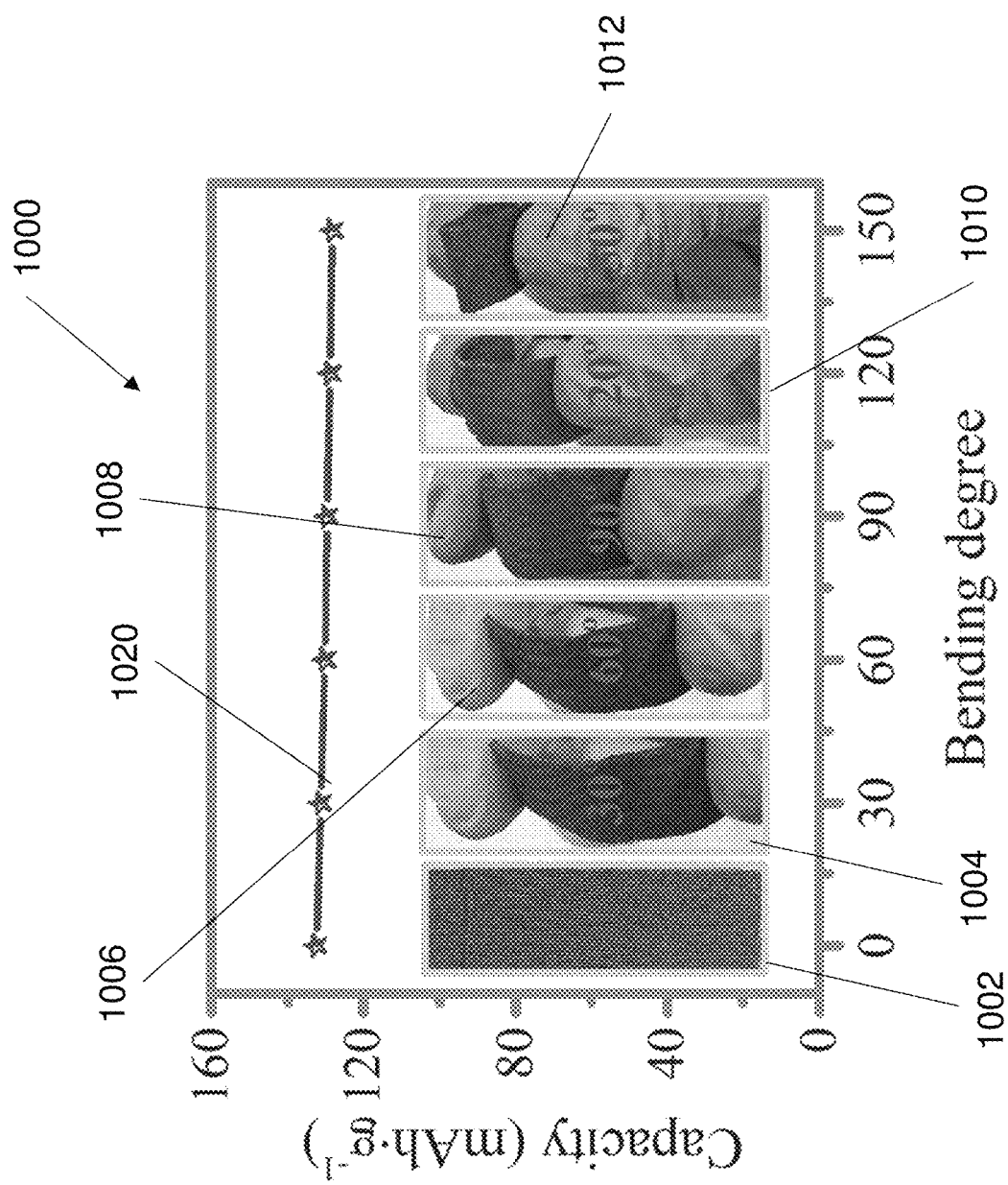
FIG. 10 shows an example of the various bending angles and the change in the capacity of the battery

The solid state battery 200 as described herein is particularly malleable and flexible. The solid state battery 200 can be bent without compromising the electrochemical performance of the battery. The solid state battery 200 is flexible due to the use of the carbon cloth as the substrate for the anode and cathode. The battery 200 can be deformed in various modes of deformation e.g. bending, tension and compression. The solid state battery 200 structure was tested to consider performance during deformation. FIG. 10 shows an plot 1000 of the various bending angles and the change in the capacity of the battery 200. The bending angles tested were 0, 30, 60, 90, 120 and 150 degrees of bending. Illustrations 1002, 1004, 1006, 1008, 1010 and 1012 correspond to the angles of bending 0 deg, 30 deg, 60 deg, 90 deg, 120 deg and 150 deg. The capacity was tested at a current density of 1 $A \cdot g^{-1}$. As can be seen in FIG. 10, on curve 1020, there is a negligible capacity loss was observed during all the various bending angles. This suggests that the performance of the battery 200 is not compromised even after bending. For example the battery 200 can be bent at 90 degrees for 1000 times while showing negligible capacity loss.

The present invention i.e. battery 100, 200 as described uses a mild electrolyte instead of an alkaline electrolyte. The battery 100, 200 sustains long cyclic stability of at least 90% capacity retention even after 5000 cycles. The battery 100, 200 also comprises a high operating voltage of at least 2V and more preferably 2.2V. This high operating voltage makes the battery 100, 200 advantageous because the battery can be used to operate a greater range of electronic devices. The battery 100, 200 is advantageous because it has capacity of at least 200 $mAh \cdot g^{-1}$. This is achieved due to the Cobalt (III) oxide electrode. The electrolyte having additives of zinc sulfate and cobalt sulfate is advantageous because it provides a higher coulombic efficiency. The battery 100, 200 is advantageous because it provides a longer cycle life as compared to standard zinc based alkaline batteries. The battery is flexible in response to mechanical loads which increases usability of the battery as it can be used in applications that may expose the battery to high mechanical loading conditions. The battery 100, 200 as described is advantageous because it is cost effective, environmentally friendly and more reliable than existing battery technology e.g. zinc based alkaline batteries. The use of Cobalt (III) in the cathode provides improved electrochemical kinetics of the cathode.

The battery 100, 200 as described can be used as a power supply device in various electronic devices. The battery 100, 200 as described is particularly suited for use in portable electronic devices or wearable electronic devices, as a power source. The battery 100, 200 as described herein can be used instead of currently used batteries such as alkaline electrolyte batteries or Zinc manages dioxide batteries. The mechanically robust battery e.g. the solid state battery 200 can be used in wearable applications as the solid state battery is malleable and can continue to function in response to mechanical loads such as for example bending. The battery 100, 200 also provides a safer power source instead of known alkaline batteries since the current batteries 100, 200 as described herein have an environmentally friendly electrolyte.

The energy storage device as described herein is a battery to convert chemical energy to electrical energy. The current embodiments described herein are embodiments of batteries. The structure described with reference to FIG. 1 or FIG. 2 may be applied to a capacitor design or a supercapacitor design, wherein the capacitor may comprise an electrode with a Cobalt (III) oxide electrode.

The various graphs and plots described herein were derived from testing performed by the inventor or a third party engaged by the inventor to illustrate the effectiveness of the battery described herein.

The description of any of these alternative embodiments is considered exemplary. Any of the alternative embodiments and features in the alternative embodiments can be used in combination with each other or with the embodiments described with respect to the figures.

The foregoing describes only a preferred embodiment of the present invention and modifications, obvious to those skilled in the art, can be made thereto without departing from the scope of the present invention. While the invention has been described with reference to a number of preferred embodiments it should be appreciated that the invention can be embodied in many other forms.

The invention claimed is:

1. An energy storage device comprising:
 a first electrode and a second electrode;
 the second electrode comprising a cobalt based compound; and
 an electrolyte disposed between the first electrode and the second electrode,
 wherein the second electrode comprises a freestanding Cobalt cathode and the first electrode comprises a freestanding Zinc anode,
 wherein the cathode comprises a carbon cloth, a plurality of Cobalt (III) oxide nanorods disposed on and/or interspersed through a portion of the carbon cloth such that the nanorods are immobilized on or within the carbon cloth.

2. The energy storage device in accordance with claim 1, wherein the cathode is synthesized by growing a plurality of Cobalt (III) oxide nanorods on the carbon cloth using urea, ammonium fluoride an excess Cobalt salt, the nanorods being grown by a hydrothermal process.

3. The energy storage device in accordance with claim 1, wherein the length of the Cobalt (III) oxide nanorods comprise a diameter between 100 nm to 300 nm.

4. The energy storage device in accordance with claim 1, wherein the plurality of Cobalt (III) oxide nanorods are arranged in a bundle and wherein the bundle of rods comprises a diameter of between 0.5 micrometres to 2 micrometres.

5. The energy storage device in accordance with claim 1, wherein each nanorod comprises one or more nanocrystals.

6. An energy storage device comprising:
 a first electrode and a second electrode;
 the second electrode comprising a cobalt based compound; and
 an electrolyte disposed between the first electrode and the second electrode,
 wherein the electrolyte comprises Zinc Sulfate and Cobalt Sulfate.

7. The energy storage device in accordance with claim 6, wherein the electrolyte comprises a polyacrylamide hydrogel with the Zinc Sulfate and Cobalt Sulfate added into the hydrogel.

8. An energy storage device comprising:
 a first electrode and a second electrode;
 the second electrode comprising a cobalt based compound; and
 an electrolyte disposed between the first electrode and the second electrode,
 wherein the energy storage device is flexible in bending such that the energy storage can elastically deform while maintaining electrochemical performance of the energy storage device; and
 wherein the energy storage device is flexible in bending such that the energy storage device can be bent to an angle of 90 degrees for 1000 times without mechanical or structural damage.

9. An energy storage device comprising:
 a first electrode and a second electrode;
 the second electrode comprising a cobalt based compound; and
 an electrolyte disposed between the first electrode and the second electrode, wherein the energy storage device comprises an operating voltage of at least 1.8V, a capacity of at least 200 mAh.g$^{-1}$ and a capacity retention of at least 90% over 5000 cycles.

10. The energy storage device in accordance with claim 1, wherein the cobalt based compound of the second electrode is a cobalt oxide.

11. The energy storage device in accordance with claim 6, wherein the cobalt based compound of the second electrode is a cobalt oxide.

12. The energy storage device in accordance with claim 8, wherein the cobalt based compound of the second electrode is a cobalt oxide.

13. The energy storage device in accordance with claim 9, wherein the cobalt based compound of the second electrode is a cobalt oxide.

14. The energy storage device in accordance with claim 10, wherein the cobalt oxide comprises Cobalt (III) oxide defined as $Co_3O_4$.

15. The energy storage device in accordance with claim 11, wherein the cobalt oxide comprises Cobalt (III) oxide defined as $Co_3O_4$.

16. The energy storage device in accordance with claim 12, wherein the cobalt oxide comprises Cobalt (III) oxide defined as $Co_3O_4$.

17. The energy storage device in accordance with claim 13, wherein the cobalt oxide comprises Cobalt (III) oxide defined as $Co_3O_4$.

18. The energy storage device in accordance with claim 1, wherein the energy storage device is a rechargeable battery.

19. The energy storage device in accordance with claim 6, wherein the energy storage device is a rechargeable battery.

20. The energy storage device in accordance with claim 8, wherein the energy storage device is a rechargeable battery.

21. The energy storage device in accordance with claim 9, wherein the energy storage device is a rechargeable battery.

* * * * *